(12) United States Patent
Baek et al.

(10) Patent No.: US 9,026,999 B2
(45) Date of Patent: May 5, 2015

(54) MEDIA PLAYBACK APPARATUS CAPABLE OF TESTING A USER APPLICATION, AND METHOD FOR TESTING A USER APPLICATION USING SAME

(75) Inventors: Wonjang Baek, Seongnam-si (KR); John Kim, Seoul (KR); Doo Hwan Yi, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 400 days.

(21) Appl. No.: 13/511,597

(22) PCT Filed: Nov. 26, 2010

(86) PCT No.: PCT/KR2010/008456
§ 371 (c)(1),
(2), (4) Date: May 23, 2012

(87) PCT Pub. No.: WO2011/065782
PCT Pub. Date: Jun. 3, 2011

(65) Prior Publication Data
US 2012/0291015 A1    Nov. 15, 2012

(30) Foreign Application Priority Data
Nov. 26, 2009 (KR) ........................ 10-2009-0115295

(51) Int. Cl.
*G06F 9/44* (2006.01)
*G06F 11/00* (2006.01)
(Continued)

(52) U.S. Cl.
CPC ........ *G06F 11/3668* (2013.01); *G06F 11/3664* (2013.01); *G06F 11/36* (2013.01);
(Continued)

(58) Field of Classification Search
CPC ............ G06F 11/3664; G06F 11/3696; G06F 11/362; G06F 11/36; G06F 11/3656; G06F 11/2273; G06F 11/3013; G06F 11/3688; G06F 11/3668; G06F 11/3692
See application file for complete search history.

(56) References Cited

U.S. PATENT DOCUMENTS 5,615,331 A    3/1997  Toorians et al. ......... 395/182.07
5,642,504 A *  6/1997  Shiga ............................. 714/33
(Continued)

FOREIGN PATENT DOCUMENTS

CN    1372662 A    10/2002
JP    2006-260354 A    9/2006
(Continued)

OTHER PUBLICATIONS

Koh Chee Lit; Automating Blu-ray Disc Player Video and Audio Testing Using LabVIEW and PXI; National Instruments Corporation; 2014; retrieved on Feb. 27, 2015; p. 1; Retrieved from the Internet: <URL: http://sine.ni.com/cs/app/doc/p/id/cs-12122>.*
(Continued)

*Primary Examiner* — Thuy Dao
*Assistant Examiner* — Hanh T Bui
(74) *Attorney, Agent, or Firm* — Stein IP, LLC

(57) ABSTRACT

The present invention relates to a media playback apparatus capable of testing a user application, and to a method for testing a user application using the same. According to the present invention, the media playback apparatus tests the user application which is generated by executing a developer application in a computing apparatus, wherein the computing apparatus is connected to the media playback apparatus through a network. Thus, applications stored in a plurality of computing apparatuses can be tested using a single media playback apparatus.

9 Claims, 4 Drawing Sheets

(51) Int. Cl.
*G06F 11/36* (2006.01)
*G06F 11/07* (2006.01)

(52) U.S. Cl.
CPC ......... *G06F11/3688* (2013.01); *G06F 11/3692* (2013.01); *G06F 11/362* (2013.01); *G06F 11/0751* (2013.01); *G06F 11/079* (2013.01); *G11B 2220/2541* (2013.01)

(56) References Cited

U.S. PATENT DOCUMENTS

| | | | | |
|---|---|---|---|---|
| 5,983,017 | A | 11/1999 | Kemp et al. | 395/704 |
| 6,618,854 | B1 | 9/2003 | Mann | 717/124 |
| 7,451,206 | B2* | 11/2008 | Geck et al. | 709/224 |
| 8,015,548 | B2* | 9/2011 | Chen et al. | 717/118 |
| 8,239,832 | B2* | 8/2012 | Stall et al. | 717/124 |
| 8,255,878 | B2* | 8/2012 | Aoki et al. | 717/124 |
| 8,336,029 | B1* | 12/2012 | McFadden et al. | 717/124 |
| 8,402,170 | B2* | 3/2013 | Harris | 717/124 |
| 8,572,568 | B2* | 10/2013 | Giat | 717/124 |
| 8,650,444 | B2* | 2/2014 | Suzuki | 714/37 |
| 2002/0026605 | A1* | 2/2002 | Terry | 714/37 |
| 2003/0051186 | A1* | 3/2003 | Boudnik et al. | 717/124 |
| 2005/0144507 | A1* | 6/2005 | Lee et al. | 714/4 |
| 2013/0152047 | A1* | 6/2013 | Moorthi et al. | 717/124 |

FOREIGN PATENT DOCUMENTS

| | | | | |
|---|---|---|---|---|
| JP | 2007-280112 A | | 10/2007 | |
| KR | 2003-0089305 | | 11/2003 | |
| KR | 2003-0089305 A | | 11/2003 | |
| WO | WO 01/04751 | * | 7/1999 | ............ G06G 11/00 |
| WO | WO 2007/111208 A1 | | 10/2007 | |

OTHER PUBLICATIONS

Bhanu Pisupati and Geoffrey Brown; Embedded software debugging using virtual filesystem abstractions; Journal of Systems Architecture; 2010; retrieved online on Feb. 27, 2015; pp. 487-499; Retrieved from the Internet: <URL: http://ac.els-cdn.com/S1383762110000809/1-s2.0-S1383762110000809-main.pdf?>.*

Andrew Reibman; Reliability analysis of a computer system for a data collection application; IEEE; 1990; retrieved online on Feb. 27, 2015; pp. 66-69; Retrieved from the Internet: <URL: http://ieeexplore.ieee.org/stamp/stamp.jsp?tp=&arnumber=130162>.*

International Search Report filed in PCT/KR2010/008456.

International Search Report of Jul. 1, 2011, issued by WIPO, for corresponding PCT/KR2010/008456.

* cited by examiner

MEDIA PLAYBACK APPARATUS CAPABLE OF TESTING A USER APPLICATION, AND METHOD FOR TESTING A USER APPLICATION USING SAME

CROSS-REFERENCE TO RELATED APPLICATIONS

This application claims the benefit of PCT International Patent Application No. PCT/KR2010/008456, filed Nov. 26, 2010, and Korean Patent Application No. 10-2009-0115295, filed Nov. 26, 2009, in the Korean Intellectual Property Office, the disclosures of which are incorporated herein by reference.

BACKGROUND OF THE INVENTION

1. Field of the Invention

The present invention relates to a media playback apparatus capable of testing a user application and a method for testing a user application using the same, and more particularly, to a media playback apparatus capable of testing a user application which is generated by executing a developer application in a computing apparatus, and a method for testing a user application using the same.

2. Description of the Related Art

A Blu-ray disc (referred to as "BD" hereinafter) provides not only HD images through a Blu-ray disc player (referred to as "BDP" hereinafter) but also various user applications executed in the BDP.

A user can be provided with a service by selecting a desired user application from various user applications stored in a BD and executing the selected user application. For example, when the user selects and executes a VOD application, a BDP accesses a VOD server to provide video selected by the user in real time.

A user application executed in a BDP is generated by compiling a source code configured in JAVA.

FIG. 1 illustrates a conventional user application development environment.

Referring to FIG. 1, a user generates a user application using application development software installed in a computing apparatus 10 such as a PC. Specifically, the user generates a source code using the application development software. The user creates a user application by compiling the source code using a compiler included in the application development software.

To test and debug the generated user application, the user stores the user application in a storage unit 20 such as a BD. The user inserts the storage unit 20 into a media playback apparatus 30 to execute the user application stored in the storage unit 20.

The media playback apparatus 30 outputs a debugging message and a log message, which are generated by the user application, through a display unit 40.

The user corrects and compiles the source code with reference to the debugging message and the log message and repeats the above-mentioned procedure.

In the conventional user application development environment, it is necessary to store a corrected user application in the storage unit 20 to test and debug the corrected user application whenever a source code is corrected.

Particularly, to test a user application executed in a media playback apparatus using a disc storage device such as a BD, an additional recording device capable of recording a user application in the disc storage device is required, resulting in additional costs for implementing an application development environment. Even when the disc storage device includes the recording device, the user has to insert the disc storage device on which a user application is recorded into the media playback apparatus, and test and debug the user application whenever the user application is corrected.

Furthermore, the user needs to check a debugging message and a log message, generated during a test and debugging process, through a display unit. Accordingly, if a plurality of debugging messages and log messages are generated, the user may not check some of the messages and may not store the debugging messages and log messages.

To solve these problems, there has been proposed a method of testing and debugging a user application by installing media player simulation software in a computing apparatus.

However, because the simulation software cannot implement the same test environment as a physical media player, even a user application, which is executed without generating an error in the test environment of the simulation software, can frequently generate errors when executed in the physical media player.

SUMMARY OF THE INVENTION

An object of the present invention is to provide a media playback apparatus capable of testing a user application which is generated by executing a developer application in a computing apparatus such that applications stored in a plurality of computing apparatuses can be tested using a single media playback apparatus, and a method for testing a user application using the same.

The object of the present invention can be achieved by providing a media playback apparatus including: a storage unit storing one of a developer application and information about a download link of the developer application; a processor executing the developer application; and a communication unit communicating with a computing apparatus which generates user applications, under the control of the processor, wherein the developer application includes: a first instruction for transmitting a user application information request to the computing apparatus through the communication unit; a second instruction for receiving information about one or more user applications, transmitted from the computing apparatus in response to the user application information request; a third instruction for transmitting, to the computing apparatus through the communication unit, a user application request for a user application selected with reference to the information about user applications; a fourth instruction for receiving the user application transmitted from the computing apparatus in response to the user application request through the communication unit; and a fifth instruction for executing the user application received according to the fourth instruction to test the user application.

The developer application may be based on Java.

The developer application may further include a sixth instruction for transmitting debugging information generated by executing the selected user application to the computing apparatus.

The developer application may further include a seventh instruction for transmitting the debugging information to the logging server.

The processor may download the developer application from a developer application storage server according to the download link and execute the developer application.

The developer application may further include an eighth instruction for transmitting a configuration request for configuration information of the computing apparatus to the computing apparatus.

The developer application may further include a ninth instruction for displaying the configuration information and the information about user applications on a display unit before the third instruction is executed.

The media playback apparatus may include a Blu-ray disc player.

The object of the present invention can be achieved by providing a method for testing a user application executed in a media playback apparatus including a storage unit storing one of a developer application and information about a download link of the developer application; a processor executing the developer application; and a communication unit communicating with a computing apparatus generating a user application, under the control of the processor, the method including steps of: (a) transmitting a user application information request to the computing apparatus through the communication unit; (b) receiving information about one or more user applications, transmitted from the computing apparatus in response to the user application information request; (c) transmitting, to the computing apparatus, a user application request for a user application selected with reference to the information about user applications; (d) receiving the user application transmitted from the computing apparatus in response to the user application request through the communication unit; and (e) executing the received user application to test the user application.

The user application may be based on Java.

The method may further include step of (f) transmitting debugging information generated in the step (e) to the computing apparatus.

The method may further include step of (g) transmitting the debugging information to a logging server.

The method may further include step of (h) downloading the developer application according to the download link prior to the step (a).

The method may further include step of (i) transmitting a configuration request for configuration information of the computing apparatus to the computing apparatus prior to the step (a).

The method may further include step of (j) displaying the configuration information and the information about user applications on a display unit prior to the step (c).

The media playback apparatus may include a Blu-ray disc player.

The media playback apparatus capable of testing a user application and a method for testing a user application using the same according to the present invention have the following advantages.

Since a user application which is generated by executing a developer application in a computing apparatus connected to the media playback apparatus through a network is tested, applications stored in a plurality of computing apparatuses can be tested using a single media playback apparatus. Accordingly, it is unnecessary for the media playback apparatus to include an additional recording device that records user applications on a disc.

In addition, a user can select and test a user application displayed through a display unit connected to the media playback apparatus according to the present invention. Therefore, the user can easily test the user application without inserting a disc storage device storing the user application into the media playback apparatus and testing and debugging the user application whenever the user application is corrected.

Furthermore, the user can easily check a debugging message generated during a test and debugging procedure since the debugging message is stored in a computing apparatus or a logging server.

Moreover, a user application can be easily and correctly tested even if simulation software of the media playback apparatus is not used.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
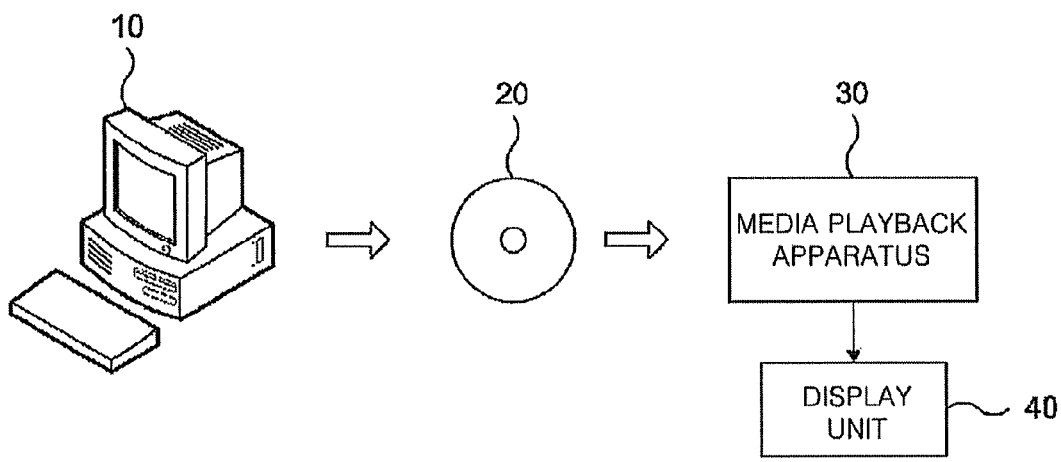
FIG. 1 illustrates a conventional user application development environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Preferred embodiments of a media playback apparatus capable of testing a user application and a method for testing a user application using the same according to the present invention will now be described with reference to the attached drawings.

Figure 2:
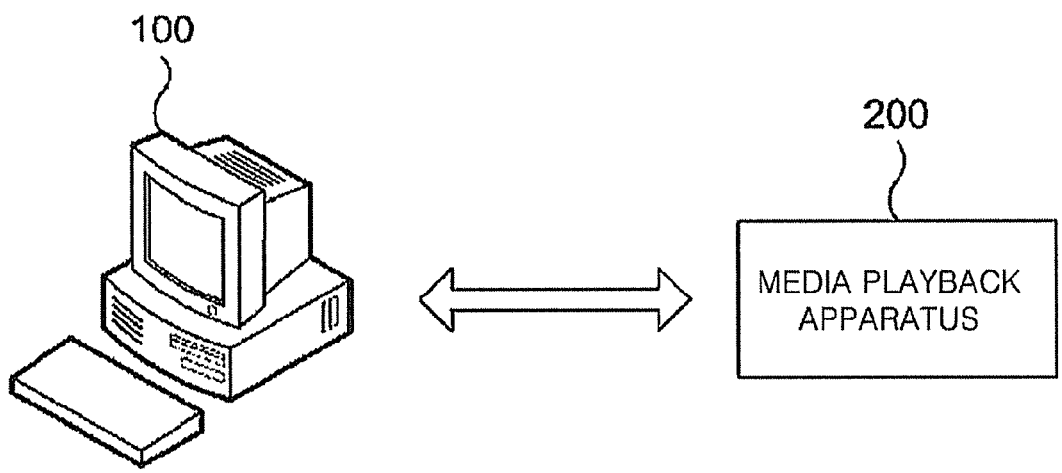
FIG. 2 illustrates a user application development environment according to the present invention.

FIG. 2 illustrates a user application development environment according to the present invention.

Referring to FIG. 2, the user application development environment of the present invention includes a computing apparatus 100 and a media playback apparatus 200. Application development software for developing a user application executed in the media playback apparatus 200 is installed in the computing apparatus 100. A user can generate a JAVA-based source code using the application development software and create a user application by compiling the source code.

A user application is software executed in the media playback apparatus 200. While user applications may include a VOD application, a word processor application, and a game application, the user applications are not limited thereto.

An application provision program including one or more instructions, which provides a user application at the request of a user, is installed and executed in the computing apparatus 100.

The media playback apparatus 200 preferably includes a BDP and can execute a JAVA-based user application. Hereinafter, the media playback apparatus refers to an apparatus capable of reproducing audio/video data stored in various storage devices such as a BD, DVD, flash memory storage unit, a hard disc, etc. and executing user applications.

The media playback apparatus 200 will now be described in detail.

Figure 3:
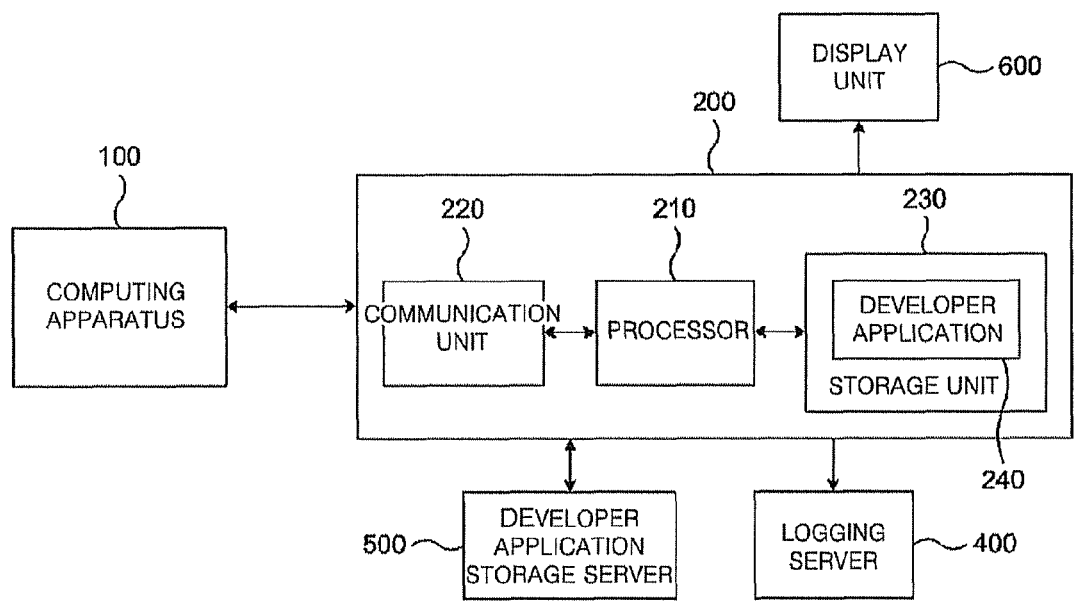
FIG. 3 is a block diagram of a media playback apparatus according to the present invention.

FIG. 3 is a block diagram of the media playback apparatus 200 according to the present invention.

Referring to FIG. 3, the media playback apparatus 200 according to the present invention includes a processor 210, a communication unit 220 and a storage unit 230.

The processor 210 executes a developer application 240 and controls the overall operation of the media playback apparatus 200.

The communication unit 220 communicates, under the control of the processor 210, with the computing apparatus 100 that generates a user application. The communication unit 220 may be the Ethernet supporting LAN.

The storage unit 230 stores one of the developer application 240 and information about a download link of the developer application 240. The storage unit 230 may be a BD, a hard disc, a flash memory, a RAM, a ROM, or a USB storage unit. However, the storage unit 230 is not limited thereto.

When the developer application 240 is stored in the storage unit 230, the processor 210 can read the developer application 240 from the storage unit 230 and execute the read developer application 240. When the information on the download link of the developer application 240 is stored in the storage unit 230, the processor 210 can download the developer application 240 from a developer application storage server 500 according to the download link and execute the developer application 240.

The developer application 240 includes one or more instructions and the processor 210 performs the one or more instruction by executing the developer application 240. The developer application 240 is preferably based on JAVA and the media playback apparatus 200 tests a user application by executing the developer application 240.

A description will be made of the developer application 240 in detail.

Figure 4:
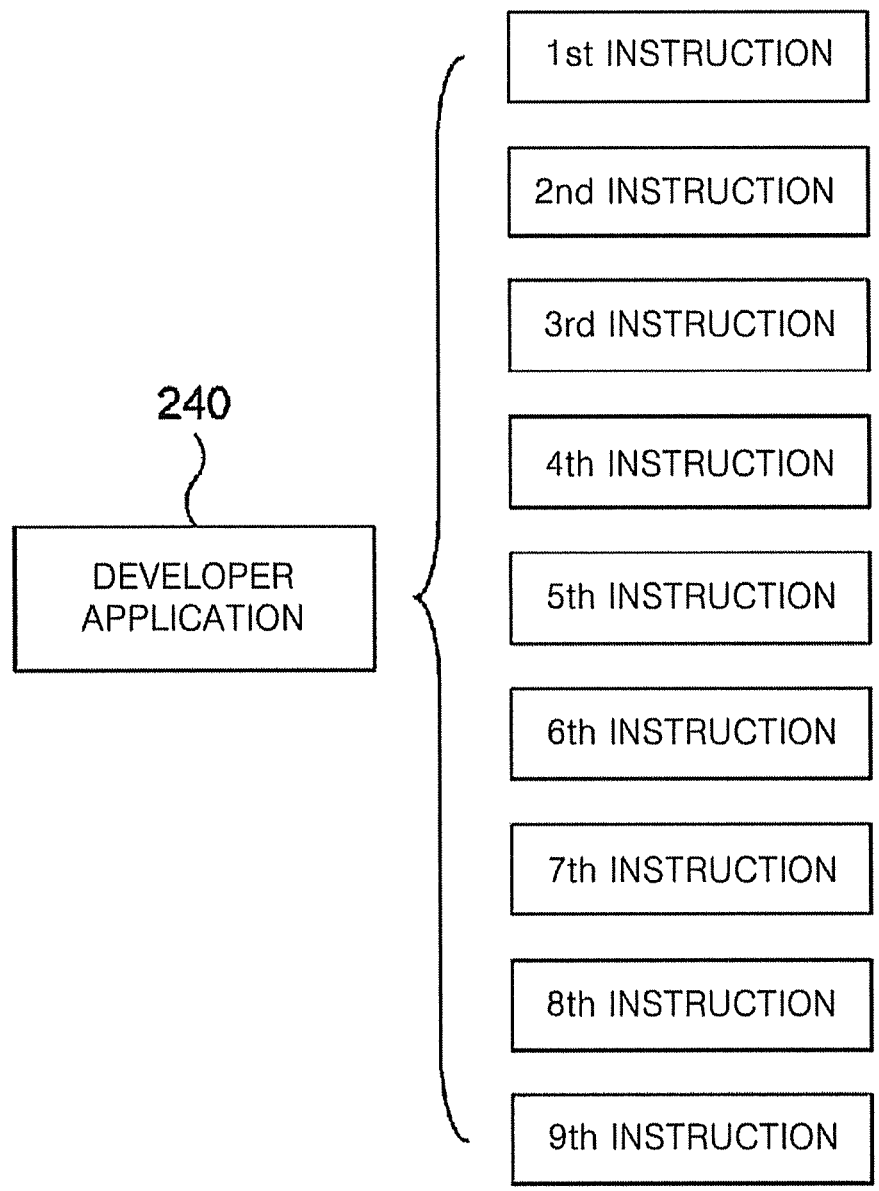
FIG. 4 illustrates a development application of the media playback apparatus according to the present invention.

As shown in FIG. 4, the developer application 240 includes first to fifth instructions and can further include fifth to ninth instructions.

When the developer application 240 is executed, the processor 210 can transmit a configuration request for configuration information of the computing apparatus 100 to the computing apparatus 100 according to an eighth instruction. The computing apparatus 100 transmits the configuration information thereof to the media playback apparatus 200 in response to the configuration request of the media playback apparatus 200. The configuration information may include the IP address and computer name of the computing apparatus 100. When one or more computing apparatuses 100 are present, the media playback apparatus 200 can broadcast the configuration request and one or more computing apparatuses 100 can transmit configuration information thereof to the media playback apparatus 200 upon reception of the configuration request.

The processor 210 transmits a user application information request to the computing apparatus 100 through the communication unit 220 according to a first instruction. The computing apparatus 100 transmits information about one or more user applications stored in the computing apparatus 100 to the media playback apparatus 200 in response to the user application information request. The information about a user application may include the title of the user application.

The processor 210 receives the information about one or more user applications from the computing apparatus 100 according to a second instruction.

The processor 210 can display the configuration information and the information about one or more user applications on the display unit according to a ninth instruction. The user can select a user application to be tested with reference to the configuration information and the information about user applications, displayed on the display unit. Particularly, when one or more computing apparatuses 100 are present, the user can identify the computing apparatus 100 with reference to the configuration information.

The processor 210 transmits a user application request for a user application selected with reference to the configuration information and the information about user applications to the computing apparatus 100 through the communication unit 220 according to a third instruction.

Upon reception of the user application request, the computing apparatus 100 transmits the selected user application to the media playback apparatus 200 in response to the user application request.

The processor 210 receives the user application transmitted from the computing apparatus 100 through the communication unit 220 according to a fourth instruction.

The processor 210 executes the received user application according to a fifth instruction to test the same.

Upon execution of the user application, debugging information is generated.

The processor 210 can transmit the debugging information generated by executing the user application to the computing apparatus 100 according to a sixth instruction.

The processor 210 can transmit the debugging information to a logging server 400 according to a seventh instruction. Simultaneously, the processor 210 can display the debugging information on the display unit 600. The debugging information transmitted to the logging server 400 is stored in the logging server 400, and thus the user can view the debugging information stored in the logging server 400.

A method for testing a user application according to the present invention will now be described in detail.

Figure 5:
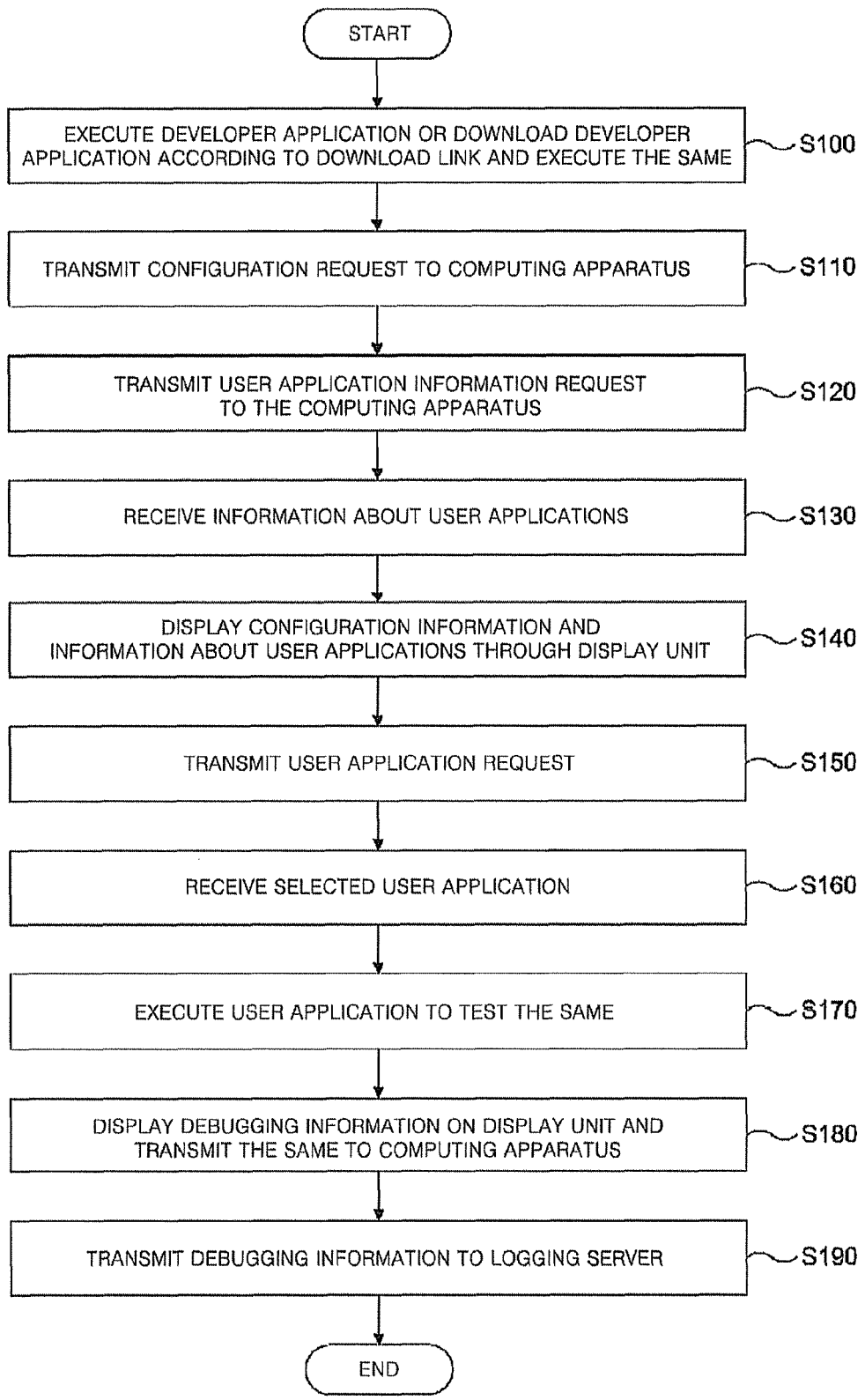
FIG. 5 is a flowchart illustrating a method for testing a user application according to the present invention.

FIG. 5 is a flowchart illustrating a method for testing a user application according to the present invention.

Referring to FIG. 5, the processor reads a developer application stored in the storage unit and executes the developer application or, when information about a download link of the developer application is present in the storage unit, downloads the developer application from a developer application storage server according to the download link (S100).

The processor transmits configuration request for the configuration information of the computing apparatus to the computing apparatus (S110). The computing apparatus transmits the configuration information thereof to the media playback apparatus in response to the configuration request of the media playback apparatus. The configuration information may include the IP address and computer name of the computing apparatus. When one or more computing apparatuses are present, the media playback apparatus can broadcast the configuration request and one or more computing apparatuses can transmit configuration information thereof to the media playback apparatus upon reception of the configuration request.

The processor transmits a user application information request to the computing apparatus (S120).

The computing apparatus transmits information about one or more user applications stored in the computing apparatus to the media playback apparatus in response to the user application information request. Information about a user application may include the title of the user application.

The processor receives the information about one or more user application transmitted from the computing apparatus (S130).

The processor displays the configuration information and the information about one or more user applications on the display unit (S140). The user can select a user application to be tested with reference to the configuration information and the information about one or more user applications, displayed on the display unit. Particularly, when one or more computing apparatuses are present, the user can identify the computing apparatuses using the displayed configuration information.

The processor transmits a user application request for a user application selected with reference to the information about one or more user applications to the computing apparatus (S150).

Upon reception of the user application request, the computing apparatus transmits the selected user application to the media playback apparatus in response to the user application request.

The processor receives the user application transmitted from the computing apparatus through the communication unit (S160).

The processor executes the user application received in step S160 to test the same (S170).

Upon execution of the user application, debugging information is generated. The generated debugging information is displayed on the display unit and transmitted to the computing apparatus (S180).

The debugging information is transmitted to the logging server (S190) and stored in the logging server such that the user can read the debugging information stored in the logging server.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A media playback apparatus for executing and testing a user application, the media playback apparatus comprising:
a storage unit storing one of a developer application and information about a download link of the developer application;
a processor executing the developer application used for testing the user application; and
a communication unit communicating with a computing apparatus which generates the user applications, under the control of the processor,
wherein the developer application comprises:
a first instruction for transmitting a first request for user application information to the computing apparatus through the communication unit;
a second instruction for receiving information about one or more user applications from the computing apparatus in response to the first request;
a third instruction for transmitting, to the computing apparatus through the communication unit, a second request for a user application selected with reference to the received information about user applications;
a fourth instruction for receiving the selected user application from the computing apparatus in response to the second request through the communication unit;
a fifth instruction for executing the received user application to test the user application;
a sixth instruction for transmitting debugging information, generated by executing the selected user application to the computing apparatus;
an eighth instruction for transmitting a configuration request for configuration information of the computing apparatus to one or more the computing apparatus before the first instruction is executed; and
a ninth instruction for displaying the configuration information and the information about user applications on a display unit before the third instruction is executed;
wherein the processor downloads the developer application from a developer application storage server according to the download link and executes the developer application.

2. The media playback apparatus according to claim 1, wherein the developer application is based on Java.

3. The media playback apparatus according to claim 1, wherein the developer application further comprises a seventh instruction for transmitting the debugging information to the logging server.

4. The media playback apparatus according to claim 1, wherein the media playback apparatus comprises a Blu-ray disc player.

5. A method for testing a user application executed in a media playback apparatus including a storage unit storing one of a developer application and information about a download link of the developer application; a processor executing the developer application used for testing a user application; and a communication unit communicating with a computing apparatus generating a user application, under the control of the processor, the method comprising steps of:
(a) transmitting a first request for user application information to the computing apparatus through the communication unit;
(b) receiving information about one or more user applications from the computing apparatus in response to the first request;
(c) transmitting, to the computing apparatus, a second request for a user application selected with reference to the received information about user applications;
(d) receiving the selected user application from the computing apparatus in response to the second request through the communication unit;
(e) executing the received user application to test the user application;
(f) transmitting debugging information generated in the step (e) to the computing apparatus;
(h) downloading the developer application according to the download link prior to the step (a);
(i) transmitting a configuration request for configuration information of the computing apparatus to one or more the computing apparatus prior to the step (a); and
(j) displaying the configuration information and the information about user applications on a display unit prior to the step (c).

6. The method according to claim 5, wherein the user application is based on Java.

7. The method according to claim 5, further comprising step of (g) transmitting the debugging information to a logging server.

8. The method according to claim 5, wherein the media playback apparatus comprises a Blu-ray disc player.

9. A media playback apparatus for executing and testing a user application, the media playback apparatus comprising:
a storage unit configured to store one of a developer application and a download link of the developer application wherein the developer application is used for testing the user application;
a processor configured to download the developer application from the storage unit according to the download link and execute the developer application; and
a communication unit configured to communicate with a computing apparatus which generates the user applications, under the control of the processor, wherein the developer application comprises instructions to:
transmit, to one or more the computing apparatus through the communication unit, a first request for configuration information of the computing apparatus;
receive, from the computing apparatus through the communication unit, the configuration information of the computing apparatus in response to the first request;
transmit, to the computing apparatus through the communication unit, a second request for user application information;
receive, from the computing apparatus through the communication unit, information about one or more user applications in response to the second request;
display, on a display, the received configuration information and the received information about one or more user applications before the transmission of the second request for user application information;
transmit, to the computing apparatus through the communication unit, a third request for a user application selected with reference to the displayed information;
receive, from the computing apparatus through the communication unit, the selected user application in response to the third request;
execute the received user application in order to test the user application and create debugging information; and
transmit, to the computing apparatus through the communication unit, the created debugging information.

* * * * *